(12) United States Patent
Delecroix et al.

(10) Patent No.: US 8,931,148 B2
(45) Date of Patent: Jan. 13, 2015

(54) METHOD OF MAKING A THREE-DIMENSIONAL FIBER PREFORM FOR FABRICATING AN ANNULAR PART OUT OF CARBON/CARBON COMPOSITE MATERIAL

(75) Inventors: Vincent Delecroix, Vernaison (FR); Kenny Chang, Union, KY (US)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 400 days.

(21) Appl. No.: 13/300,047

(22) Filed: Nov. 18, 2011

(65) Prior Publication Data

US 2012/0131775 A1 May 31, 2012

(30) Foreign Application Priority Data

Nov. 26, 2010 (FR) ...................... 10 59782

(51) Int. Cl.
*D04H 3/10* (2012.01)
*C04B 35/83* (2006.01)
*B32B 18/00* (2006.01)
*D04H 1/4242* (2012.01)
*D04H 1/498* (2012.01)
*D04H 3/002* (2012.01)
*D04H 3/105* (2012.01)

(52) U.S. Cl.
CPC ................ *C04B 35/83* (2013.01); *B32B 18/00* (2013.01); *D04H 1/4242* (2013.01); *D04H 1/498* (2013.01); *D04H 3/002* (2013.01); *D04H 3/105* (2013.01); *C04B 2235/608* (2013.01); *C04B 2237/385* (2013.01); *C04B 2237/586* (2013.01); *C04B 2235/656* (2013.01); *C04B 2235/667* (2013.01)
USPC .......................................................... 28/107

(58) Field of Classification Search
CPC ....... D04H 1/498; D04H 1/4242; D04H 1/46; D04H 3/105; C04B 2237/586; C04B 2237/385; C04B 2235/608; C04B 35/83; B32B 18/00

USPC .......... 28/107, 109, 112, 111, 113, 114, 115; 442/402
See application file for complete search history.

(56) References Cited

U.S. PATENT DOCUMENTS

| | | | | |
|---|---|---|---|---|
| 3,936,555 | A | * | 2/1976 | Smith, II ..................... 428/151 |
| 3,940,532 | A | * | 2/1976 | Smith, II ..................... 428/218 |
| 4,790,052 | A | * | 12/1988 | Olry ............................. 28/110 |
| 4,847,140 | A | * | 7/1989 | Jaskowski .................... 428/220 |
| 4,987,664 | A | * | 1/1991 | McCullough et al. ......... 28/103 |
| 5,609,707 | A | * | 3/1997 | Bazshushtari et al. ........ 156/148 |
| 5,766,745 | A | * | 6/1998 | Smith et al. ................... 428/218 |
| 5,792,715 | A | * | 8/1998 | Duval et al. .................. 442/388 |
| 6,174,594 | B1 | * | 1/2001 | Smith et al. ................... 428/218 |
| 6,367,130 | B1 | * | 4/2002 | Duval et al. .................... 28/107 |
| 2011/0083305 | A1 | * | 4/2011 | La Forest et al. .............. 28/112 |

FOREIGN PATENT DOCUMENTS

| | | |
|---|---|---|
| FR | 2711645 | 5/1995 |
| FR | 2824086 | 10/2002 |
| WO | WO 02/088451 | 11/2002 |

OTHER PUBLICATIONS

International Search Report date Jul. 6, 2011 for FR1059782.

* cited by examiner

*Primary Examiner* — Amy Vanatta
(74) *Attorney, Agent, or Firm* — Pillsbury Winthrop Shaw Pittman, LLP

(57) ABSTRACT

A method of making a three-dimensional fiber preform for fabricating an annular part out of carbon-carbon composite material, the method including stacking layers of a fiber sheet made up of carbon yarns or tows, needling the layers one by one as they are superposed so as to bond them together, and locally modifying the electromagnetic properties of the fiber preform by increasing the fiber density of the layers of the fiber sheet that are situated at half-thickness of the fiber preform.

6 Claims, No Drawings

METHOD OF MAKING A THREE-DIMENSIONAL FIBER PREFORM FOR FABRICATING AN ANNULAR PART OUT OF CARBON/CARBON COMPOSITE MATERIAL

CROSS REFERENCE TO RELATED APPLICATIONS

This application claims the benefit of priority from French Patent Application No. 1059782 filed on Nov. 26, 2010, the entire content of which is incorporated herein by reference.

BACKGROUND

The present invention relates to making a three-dimensional fiber preform.

A particular field of application for the invention is making three-dimensional fiber preforms for fabricating annular parts out of carbon-carbon (C—C) composite material, in particular fabricating brake disks.

Brake disks made of composite material, in particular of composite material having carbon fiber reinforcement and a carbon matrix (carbon/carbon composite) are well known. Fabricating them comprises making an annular fiber preform and densifying it with a matrix.

The fiber preform is usually made by stacking layers or plies of a fiber sheet and by bonding the layers together, typically by needling. The fiber sheet may be linear, in which case the annular shape for the preform is obtained by cutting a disk out from the resulting block that is made up of stacked layers of the fiber sheet. Alternatively, the fiber sheet may be helical with the annular shape of the preform then being obtained directly by stacking and needling layers of the fiber sheet.

The annular fiber preform as obtained in this way is generally densified either by chemical vapor infiltration (CVI), or by using a liquid technique (impregnation with a resin that is a precursor of the matrix, and pyrolyzing the resin).

Another known method of densification to which the invention applies more particularly is film-boiling. This consists in placing the annular fiber preform in a reactor between two spiral inductor coils, the reactor being filled with a carbon precursor that is liquid at ambient temperature, so that the preform and the inductor coils are completely immersed in the liquid. The preform is then heated by electromagnetic coupling until its internal temperature reaches approximately 1000° C., thereby cracking the precursor within the preform and subsequently causing the carbon matrix to be deposited.

The advantage of film-boiling densification compared with CVI densification as conventionally used in the fabrication of brake disks lies in its high speed of densification (about 100 times faster than densification using a gaseous technique). These reaction kinetics are made possible by setting up a steep temperature gradient between the core of the preform and its surface that is cooled by the precursor, which is boiling. Densification thus takes place preferentially in the core of the material, rather than at its surface as happens when performing densification by CVI, thereby making it possible to use conditions that give rise to fast reaction kinetics.

This particular method of densification is intimately associated with the characteristics of the preform itself. In particular, the configuration of the fiber reinforcement, the kind of fibers used, the defects in the preform, etc., all have a significant influence on the temperature profile that is generated during electromagnetic coupling, and thus on the speed with which the preform is densified.

SUMMARY

A main aspect of the present invention is to propose a method of making a fiber preform that enables its rate of densification by film-boiling to be improved.

This aspect is achieved by a method of making a fiber preform during which, in accordance with an embodiment of the invention, provision is made to modify locally the electromagnetic properties of the fiber preform by increasing the density of fibers in certain layers of the fiber sheet.

Fiber density is increased locally without changing the nature of the carbon yarns or tows making up the fiber sheet. This increase serves to enhance the electromagnetic coupling to which the preform is subjected in a particular zone of the preform. By selecting this zone appropriately, it becomes possible to accelerate densification of the preform by film-boiling.

Beneficially, the fiber density is increased for the layers of the fiber sheet that are situated at half-thickness of the fiber preform. By enhancing electromagnetic coupling at half-thickness of the preform, densification of such a preform will begin in this zone of the preform so each densification front will need to travel through only half the thickness of the preform. This gives rise to densification cycles that are much faster.

In another implementation of the invention, the layers of the fiber sheet in which the fiber density is increased are subjected to needling with parameters that are different from the parameters of the needling to which the other layers are subjected.

Thus, the layers of the fiber sheet in which the fiber density is increased may be subjected to needling with a needling density that is greater than that of the needling to which the other layers are subjected. For example, these layers may be subjected to needling with a needling density of about 60 strokes per square centimeter (strokes/cm$^2$), the other layers being subjected to needling with a needling density of about 30 strokes/cm$^2$.

Alternatively, the layers of the fiber sheet in which the fiber density is increased are subjected to needling with a penetration depth for the needles that is greater than that of the needling to which the other layers are subjected. For example, these layers may be subjected to needling with a penetration depth for the needles lying in the range 14.5 millimeters (mm) to 15.5 mm, the other layers being subjected to needling with a penetration depth for the needles of about 12.5 mm.

In another implementation of the invention, the layers of the fiber sheet in which the fiber density is increased present a weight that is greater than that of the other layers. For example, these layers may present a weight of the order of 1100 grams per square meter (g/m$^2$), while the other layers present a weight of the order of 700 g/m$^2$.

DETAILED DESCRIPTION OF IMPLEMENTATIONS

An embodiment of the invention relates to making three-dimensional fiber preforms for use particularly, but not exclusively, in fabricating brake disks out of carbon-carbon (C—C) composite material.

The fabrication of brake disk out of composite material, in particular out of composite material having carbon fiber reinforcement and a carbon matrix (carbon/carbon composites) comprises making an annular fiber preform from fiber sheets, each made up of yarns or tows of carbon, and densifying the annular fiber preform with a matrix.

When densification is performed by film-boiling, the annular fiber preform is placed in conventional manner in a reactor between two spiral inductor coils. The reactor is then filled with a carbon precursor that is liquid at ambient temperature so as to completely immerse the preform and the inductor coils.

Since the preform is made of yarns or tows that are electrically conductive, it can be heated directly by electromagnetic coupling until its internal temperature reaches approximately 1000° C., thereby causing the precursor to crack within it, followed by deposition of the carbon matrix.

In order to accelerate the film-boiling process, an embodiment of the invention seeks during this operation to enhance electromagnetic coupling, in a particular zone of the fiber preform.

For this purpose, an embodiment of the invention makes provision for locally modifying the electromagnetic properties of the fiber preform by increasing the fiber density—and thus the electrical conductivity—of certain sheets forming the fiber preform.

Ideally, since the fiber preform is of annular shape, the local increase in fiber density relates to sheets that are situated at mid-thickness of the preform.

Two particular implementations of fiber preforms made in accordance with embodiments of the invention are described below. Whatever the implementation, it should be observed that the local increase in fiber density for certain sheets of the fiber preform of the invention is achieved without changing the nature of the yarns or tows in the fiber sheet.

Example 1

Making a Fiber Preform from a Linear Sheet with Modification of Needling Parameters In this example, the fiber preform is made from a two-dimensional linear sheet made up of carbon yarns or tows, e.g. tows of oxidized polyacryonitrile (PAN) filaments. Layers or plies of the linear sheet are stacked on one another on a needling table and they are needled one by one as they are superposed so as to build up a block. Annular fiber preforms are then cut from the block.

The needling table used while making the fiber preform is itself well known and is therefore not described in detail herein. In outline, the table comprises a horizontal work surface on which the linear sheet is placed, means for driving (broadly termed a driver) the sheet on the surface, and a needling head that is caused to reciprocate vertically relative to the surface.

The needling head carries needles that are provided with barbs, hooks, or forks for taking fibers from the stacked layers of the preform and for pulling them through the layers on penetrating the preform. Furthermore, each time a new layer is needled, the work surface of the needling table is moved vertically by appropriate drive means or driver through a determined downward step that corresponds to a thickness of a needled layer.

The needling parameters that can be modified when using such a table include in particular needling density, i.e. the number of strokes received per square centimeter ($cm^2$) of the layer for needling as it passes under the needling head, and the penetration depth of the needles into the preform.

In this implementation, the fiber preform is made up of a stack of 21 layers of a linear sheet, itself made up of tows of oxidized PAN filaments.

The first two layers of the linear sheet are superposed and then needled together with a needling density of 30 strokes/$cm^2$ and with the needles penetrating by about 12.5 mm.

The following seven layers are stacked and needled one by one using the same needling density (i.e. 30 strokes/$cm^2$) while causing the work surface of the table to move down in such a manner as to ensure that the penetration depth of the needles remains constant, i.e. about 12.5 mm.

The following three layers (i.e. the $10^{th}$, the $11^{th}$, and the $12^{th}$) are superposed on the nine first layers and needled one by one with a needling density that is greater than that used for needling the nine first layers, so as to increase the fiber density in these layers.

For example, a needling density of 60 strokes/$cm^2$ is selected with the work surface of the needling table being programmed to move downwards so as to ensure that the penetration depth of the needles remains identical at 12.5 mm.

It can readily be understood that increasing the number of strokes per $cm^2$ that are received by the three layers situated at mid-thickness of the preform as they pass under the needling head automatically serves to increase the number of needle passes through these layers, and thus the number of fibers that are transferred from the underlying layers into these three particular layers. This results in an increase in their fiber density.

Finally, the nine following layers are stacked on the first 12 layers and needled one by one using the same needling density and the same penetration depth for the needles as was used with the first nine layers.

In a variant of this implementation, needling density remains identical for all of the 21 layers of the liner sheets, with the three layers situated at half-thickness of the preform (i.e. the $10^{th}$, $11^{th}$, and $12^{th}$ layers) being subjected to needling with the needles having a penetration depth that is greater than the depth used for the needling that is applied to the other layers.

For example, a penetration depth is selected for the needles that lies in the range 14.5 mm to 15.5 mm for these three layers in which it is desired to increase the fiber density, the other layers being subjected to needling with a penetration depth of the needles of about 12.5 mm.

In this variant, for the three layers situated at half-thickness of the preform, the needles of the needling table penetrate more deeply into the preform while it passes under the needling head. A greater number of fibers are thus transferred from the underlying layers to these three particular layers. This increases their fiber density.

As a result, the three layers situated at half-thickness in the fiber preform as formed in this way present fiber densities that are greater than the fiber densities of the first nine layers and of the last nine layers of the preform, with this increase in fiber density being obtained without changing the nature of the carbon tows that make up the linear fiber sheet.

Annular fiber performs are then cut out from the plate as obtained in this way and they are placed in a film-boiling reactor between two spiral inductor coils, as described above. Since each annular fiber preform has a greater fiber density at half-thickness, the electromagnetic coupling during the film-boiling operation is enhanced in that zone. As a result densification of the preform will begin in this half-thickness zone and the densification fronts will need to pass through only half the thickness of the preform. This results in an acceleration of the overall densification of the preform.

Example 2

Making a Fiber Preform from a Helical Sheet with Modification to the Weight of the Sheet In this implementation, the first annular fiber preform is made from two-dimensional helical sheets, each made up of carbon yarns or tows, e.g. tows of oxidized polyacrylonitrile (PAN) filaments. Making such helical sheets is itself well known and is therefore not described in detail herein.

The layers or plies of these helical sheets are stacked one on another on a circular needling table and they are needled to one another progressively as they are superposed in order to form an annular preform directly.

The circular needling table used in this implementation is substantially identical in terms of operation as that described briefly above, and it is therefore not described in detail. Where necessary, reference may be made to document WO 02/088451 that describes an embodiment thereof.

Initially, two types of helical sheet having different weights are prepared. For example one of the sheets weighs 700 g/m$^2$ and the other weighs 1100 g/m$^2$. The sheet weighing 1100 g/m$^2$ may be obtained, during fabrication of the sheet, by increasing the quantity of carbon tows that extend in one direction, e.g. the circumferential direction. This sheet thus presents fibers at a density greater than that of the sheet weighing 700 g/m$^2$.

Nine layers of the 700 g/m$^2$ sheets are initially stacked and needled on one another with the same needling density while the work surface of the table is caused to move downwards so as to ensure that the needles penetrate to a constant depth. For example, a needling density of 45 strokes/cm$^2$ is selected in association with a needle penetration depth of about 12 mm.

The 700 g/m$^2$ sheet is then replaced by the 1100 g/m$^2$ sheet. Three layers of this helical sheet (i.e. the $10^{th}$, the $11^{th}$, and $12^{th}$ layers of the preform) are then superposed on the nine first layers and needled one by one with the same needling parameters (needling density 45 strokes/cm$^2$ and needle penetration depth of 12 mm) so as to build up the central layers of the preform.

The 700 g/m$^2$ sheet is then positioned once more on the needling table and nine new layers of this sheet are superposed on the other layers and needled one by one, still with the same needling parameters.

As a result, the three layers situated at half-thickness of the fiber preform made in this way present fiber densities that are greater than those of the nine first layers and of the nine last layers of the preform, this increase in fiber density being obtained without changing the nature of the tows making up the linear sheet.

The annular fiber preform as obtained in this way is then placed in a film-boiling reactor between two spiral inductor coils as described above. Since this preform has a fiber density that is greater at half-thickness, the electromagnetic coupling during the film-boiling operation is enhanced in this zone. As a result densification of the preform begins in this zone at half-thickness, and each densification front needs to travel through only half the thickness of the preform. This results in an acceleration of the overall densification of the preform.

Alternatively, the same 700 g/m$^2$ sheet could be used for making all of the 21 layers of the fiber preform, with additional tows of the same kind then being incorporated during needling in the $10^{th}$, $11^{th}$, and $12^{th}$ layers in order to increase the weight of those layers.

For example, with a sheet made up of seven circumferential tows (so-called 0° tows) and ten transverse tows (so-called 60° tows), this sheet having a width of 10 centimeters (cm) and a weight of 700 g/m$^2$, it is possible to incorporate five additional tows at 0° while needling the $10^{th}$, $11^{th}$, and $12^{th}$ layers. By using tows of the same kind as those forming the sheet and having a weight per unit length of 3.8 grams per meter (g/m), the weight of the $10^{th}$, $11^{th}$, and $12^{th}$ layers of the resulting preform is thus increased by 190 g/m$^2$.

In practice, the additional tows at 0° that are incorporated are initially fastened on the sheet when needling the $10^{th}$ layer (fastening by needling, adhesive, or blowing, for example). The $10^{th}$, $11^{th}$, and $12^{th}$ layers are then needled with these additional tows and then they are cut after needling the $12^{th}$ layer.

What is claimed is:

1. A method of making a three-dimensional fiber preform for fabricating an annular part out of carbon-carbon composite material, the method comprising:
   stacking layers of a fiber sheet made up of carbon yarns or tows;
   needling the layers one by one as they are superposed so as to bond them together, and
   locally modifying the electromagnetic properties of the fiber preform to form a locally modified region by increasing the fiber density of the layers of the fiber sheet that are situated at half-thickness of the fiber preform, wherein the increasing the fiber density of the layers comprises performing the needling in the locally modified region using either: a needling density greater than that used outside of the locally modified region, and with a same penetration depth of the needles as that used outside the locally modified region, or a penetration depth of the needles greater than that of the needling outside the locally modified region and a same needling density as that used outside the locally modified region.

2. A method according to claim 1, wherein the locally modified region comprises a material having a weight of about 1100 g/m$^2$ and outside the locally modified region, the material has a weight of about 700 g/m$^2$.

3. A method according to claim 1, wherein the increasing the fiber density of the layers comprises performing the needling in the locally modified region using a needling density greater than that used outside of the locally modified region, and with a same penetration depth of the needles as that used outside the locally modified region.

4. A method according to claim 3, wherein the needling density in the locally modified region is a needling density of about 60 strokes/cm$^2$, and the needling density outside the locally modified region is a needling density of about 30 strokes/cm$^2$.

5. A method according to claim 1, wherein the increasing the fiber density of the layers comprises performing the needling in the locally modified region using a penetration depth greater than that of the needling outside the locally modified region and a same needling density as that used outside the locally modified region.

6. A method according to claim 5, wherein the penetration depth for the needling in the locally modified is in the range 14.5 mm to 15.5 mm, and the penetration depth for the needling outside the locally modified region is about 12.5 mm.

* * * * *